United States Patent
Jeong et al.

(10) Patent No.: US 7,775,239 B2
(45) Date of Patent: Aug. 17, 2010

(54) BUFFERED ROTARY VALVE

(75) Inventors: Sang Kwon Jeong, Daejeon (KR); Je Heon Jeong, Daejeon (KR); Gyu Wan Hwang, Goyang (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 773 days.

(21) Appl. No.: 11/698,255

(22) Filed: Jan. 25, 2007

(65) Prior Publication Data

US 2008/0116410 A1 May 22, 2008

(30) Foreign Application Priority Data

Nov. 21, 2006 (KR) .................. 10-2006-0115281

(51) Int. Cl.
*F16K 11/074* (2006.01)
*F25B 9/14* (2006.01)
(52) U.S. Cl. ...................... 137/625.21; 62/6
(58) Field of Classification Search ............ 137/625.21, 137/625.22, 625.23, 625.24; 62/6
See application file for complete search history.

(56) References Cited

U.S. PATENT DOCUMENTS 3,620,029 A * 11/1971 Longsworth ............... 62/6
4,430,863 A * 2/1984 Longsworth ............... 62/6
4,987,743 A * 1/1991 Lobb ...................... 62/6
5,515,685 A * 5/1996 Yanai et al. ............... 62/6
6,038,866 A * 3/2000 Okamoto et al. .......... 62/6
6,045,759 A   4/2000 Ford et al.
6,378,312 B1 * 4/2002 Wang ..................... 62/6
6,434,947 B2   8/2002 Zhu et al.
6,460,349 B1 * 10/2002 Kawano et al. ........... 62/6
6,694,749 B2 * 2/2004 Heron ..................... 62/6
7,509,814 B2 * 3/2009 Xu ........................ 62/6
2004/0040315 A1 * 3/2004 Koyama et al. ........... 62/6
2007/0107442 A1 * 5/2007 Seitz et al. ............... 62/6

FOREIGN PATENT DOCUMENTS

WO  WO 2008/057596   5/2008
WO  WO 2009/011969   1/2009

* cited by examiner

*Primary Examiner*—John Rivell
(74) *Attorney, Agent, or Firm*—Michael Best & Friedrich LLP

(57) ABSTRACT

There is provided a buffered rotary valve in which a valve is additionally installed in a rotary valve for supplying a fluid of high pressure and a fluid of low pressure being input from a compressor, thereby reducing the amount of fluid being supplied and unnecessarily consumed, and enhancing the efficiency of a freezing system.

14 Claims, 5 Drawing Sheets

PRIOR ART

PRIOR ART       PRIOR ART

BUFFERED ROTARY VALVE

CROSS-REFERENCE TO RELATED PATENT APPLICATION

Priority is hereby claimed to Korean Patent Application No. 10-2006-0115281, filed on Nov. 21, 2006, the entire contents of which are incorporated herein by reference.

BACKGROUND OF THE INVENTION

1. Field of the Invention

The present invention relates to a buffered rotary valve, and more particularly, to a buffered rotary valve in which a buffer is additionally installed in a rotary valve to supply a fluid of high pressure and a fluid of low pressure, being input from a compressor, to a freezer, thereby reducing the amount of fluid being supplied and unnecessarily consumed, and enhancing the efficiency of a freezing system.

2. Description of the Related Art

Generally, a rotary valve is a device used to supply a gas of high pressure and a gas of low pressure, being generated in a compressor, to a freezer, by periodically alternating the gas of high pressure and the gas of low pressure. A rotary valve is used as a constituent of a regenerative extreme low temperature freezer, such as a Gifford-MacMahon (GM) freezer or a GM pulse tube freezer.

FIG. 1 is a schematic view showing the structure of a conventional rotary valve, FIG. 2 is a perspective view illustrating a valve seat of the conventional rotary valve, FIG. 3 is a perspective view illustrating a valve head of the conventional rotary valve, and FIG. 4 includes a block diagram illustrating a freezing system using the conventional rotary valve.

FIG. 1 illustrates an operational structure of a rotary valve. Generally, a rotary valve comprises four constituents, such as a valve head 1, a valve seat 2, a driving motor 3 and a pressure container 4, as illustrated in FIG. 1. The pressure container includes three exterior ports, such as a high pressure port 4a, a low pressure port 4b and a pulse pressure port 4c. The high pressure port 4a and the low pressure port 4b are connected to an outlet and an inlet of a compressor, respectively, and the pulse pressure port 4c is connected to a freezer.

In the interior structure of the pressure container 4, the high pressure port 4a is connected to an empty space with the driving motor 3 inside the pressure container 4 and is filled with high pressure fluid, and the low pressure port 4b is connected to a low pressure path 5 formed in the valve seat 2 and fills the low pressure path 5 with low pressure fluid.

As illustrated in FIG. 2, the valve seat 2 includes the low pressure path 5 and output paths 6 being connected to the pulse pressure port 4c. As illustrated in FIG. 3, the valve head 1 includes high pressure grooves 7, a low pressure groove 8, and a motor shaft receiver 9 so that the valve head 1 is connected to the driving motor 3.

The valve head 1 is connected to the driving motor 3 by the motor shaft receiver 9 and is rotated on the valve seat 2 by the driving motor 3, thereby alternately supplying the high pressure fluid and the low pressure fluid to the output paths 6 formed in the valve seat 2. The aforementioned process will be described in detail as follows. When the high pressure grooves 7 of the valve head 1 are exposed to the high pressure fluid in the pressure container 4, the valve head 1 supplies the high pressure fluid through the output paths 6 and is rotated 90 degrees by the motor 3. Then, the high pressure grooves 7 of the valve head 1 are covered by the valve seat 2 and the low pressure groove 8 of the valve head 1 connects to the low pressure path 5 of the valve seat 2 and the output path 6 of the valve seat 2, thereby supplying the low pressure fluid to the freezer.

Referring to FIGS. 4A and 4B, the pressure and the amount of fluid being supplied from a rotary valve 11 connected with a compressor 10 to the freezer as shown in FIG. 4A are observed as shown in FIG. 4B. While the pressure is momentarily changed, a great amount of fluid is generated between the rotary valve 11 and the freezer, and this momentary fluid pulse does not contribute to the freezing of the freezer. Accordingly, in view of thermodynamics, since the mass of the gas supplied from the compressor 10 is not entirely used in the freezer, the entire efficiency of the freezer decreases.

SUMMARY OF THE INVENTION

The present invention provides a buffered rotary valve in which a buffer is additionally installed in a rotary valve for supplying a fluid of high pressure and a fluid of low pressure being input from a compressor to a freezer, thereby lessening an amount of fluid being supplied and unnecessarily consumed, to increase the efficiency of a freezing system.

According to an embodiment of the present invention, there is provided a buffered rotary valve configured to be connected to a compressor, wherein the buffered rotary valve comprises: a pressure container including a high pressure port, a low pressure port, and a plurality of pulse pressure ports, the high pressure port and the low pressure port formed on an outer surface of the pressure container and connected to an outlet and an inlet of a compressor, respectively, and the plurality of pulse pressure ports being formed at a lower portion of the pressure container and configured to be connected to a freezer; a valve head connected to a driving motor positioned inside the pressure container, the valve head configured to be rotated by the driving motor; a valve seat positioned under the valve head and alternately transferring a fluid having a high pressure and a fluid having a low pressure to the freezer as the valve head is rotated; and a buffer positioned on an outer edge surface of the valve seat and configured to supply a fluid having a buffer pressure, the buffer pressure between the high pressure and the low pressure alternately supplied to the freezer.

The valve head may include an upper valve head formed to be connected to a shaft of the driving motor for rotation by the driving motor, and a lower valve head positioned between the lower part of the upper valve head and the upper surface of the valve seat, wherein the upper valve head includes a protrusion formed on the middle portion of the upper surface, the protrusion having a groove to inwardly receive the shaft of the driving motor, and a plurality of high pressure holes each having a round shape and being symmetrically positioned on either side of the protrusion; and the lower valve head may include a plurality of high pressure holes to correspond to the positions of the high pressure holes formed in the upper valve head, a low pressure groove in a stick shape formed between the high pressure holes, and a plurality of buffer grooves, each buffer groove formed between an end of the low pressure groove and the high pressure hole.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will more fully convey the scope of the invention to those skilled in the art.

Figure 5:
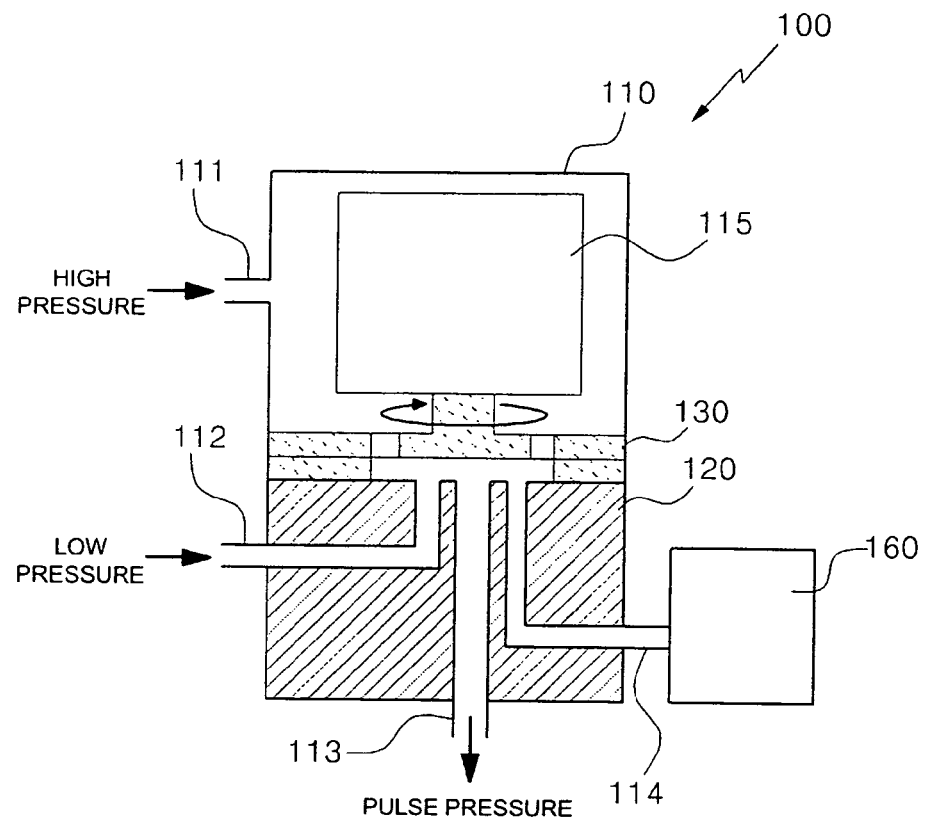
FIG. 5 is a sectional view illustrating a buffered rotary valve according to an embodiment of the present invention.

FIG. 5 is a sectional view illustrating a buffered rotary valve 100 according to an embodiment of the present invention.

As illustrated in FIG. 5, the buffered rotary valve 100 comprises a pressure container 110 formed exteriorly, a valve head 130 being rotated by a driving motor 115 positioned inside the pressure container 110, a valve seat 120 formed under the lower end of the valve head 130, and a buffer 160 positioned to be connected to an outer circumference surface of the valve seat 120.

A high pressure port 111 and a low pressure port 112 are formed on the outer surface of the pressure container 110 and are connected to an output and an input of a compressor 140, respectively, positioned outside of the pressure container 110. The compressor 140 supplies a high pressure fluid (i.e., a fluid having a relatively high pressure) and a low pressure fluid (i.e., a fluid having a relatively low pressure) to the buffered rotary valve 100. A plurality of pulse pressure ports 113 are formed at a lower end part of the pressure container 110 and are connected to a freezer 150 positioned outside of the pressure container 110.

The pressure container 110 has a cylindrical shape and further includes a buffer port 114 which is formed at one end of the outer circumference surface and which is connected to the buffer 160. The driving motor 115 is positioned at the upper part in the pressure container 110, and the buffer 160 supplies a buffer pressure fluid (i.e., a fluid having a pressure between the relatively high pressure and the relatively low pressure) to the buffered rotary valve 100, in addition to the high pressure fluid and the low pressure fluid generated in the compressor 140.

Figure 6:
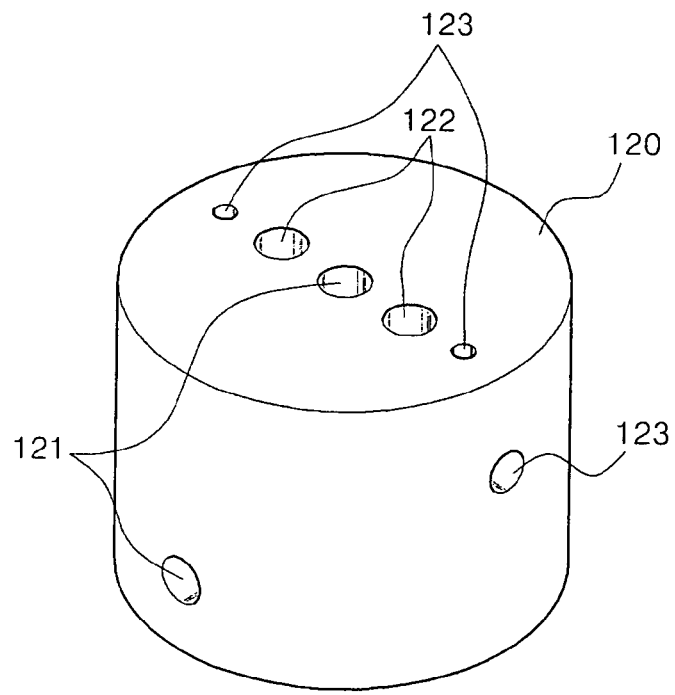
FIG. 6 is a perspective view illustrating a valve seat according to an embodiment of the present invention.
Figure 7:
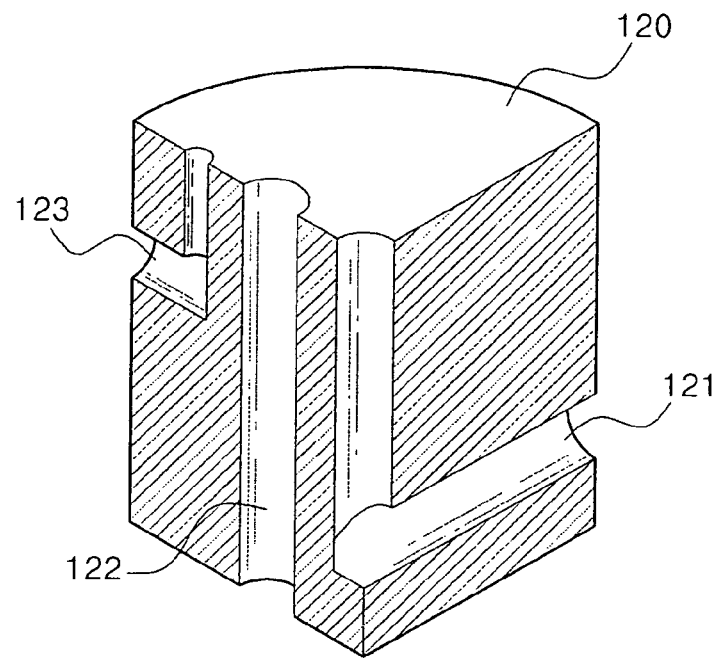
FIG. 7 is a partial perspective view illustrating the valve seat of FIG. 6.

FIG. 6 is a perspective view illustrating the valve seat 120 according to an embodiment of the present invention, and FIG. 7 is a partial perspective view illustrating the valve seat 120 of FIG. 6.

As illustrated in FIGS. 6 and 7, the valve seat 120 is positioned at the lower end part in the pressure container 110, and the valve head 130 is positioned on the valve seat 120. The valve seat 120 alternately supplies the high pressure fluid, the low pressure fluid, and the buffer pressure fluid to the freezer 150 as the valve head 130 is rotated. The valve seat 120 has a cylindrical shape like the pressure container 110.

The valve seat 120 includes a low pressure path 121, a plurality of output paths 122 and a plurality of buffer paths 123. The low pressure path 121 is formed to correspond to the position of the low pressure port 112 formed on the outer circumference surface of the pressure container 110 and to allow fluid communication between one end of the outer circumferential surface of the valve seat 120 and the middle portion of the upper surface of the valve seat 120. Each output path 122 is formed to correspond to the position of each pulse pressure port 113 formed at the lower end part of the pressure container 110 and to allow fluid communication between the lower surface of the valve seat 120 and the upper surface of the valve seat 120. Each buffer path 123 is formed to correspond to the position of the buffer port 114 formed on the outer circumference surface of the pressure container 110 and to allow fluid communication between one end of the outer circumference surface of the valve seat 120 and one end of the upper surface of the valve seat 120.

Accordingly, the low pressure path 121 is formed in the middle portion of the upper surface of the valve seat 120, the output paths 122 are symmetrically positioned at either side of the low pressure path 121, and the buffer paths 123 are formed to be spaced apart from the output paths 122, at a predetermined interval, in both directions of the low pressure path 121.

The low pressure path 121 has its section in an "L" shape in which the low pressure path 121 is bent at a right angle so as to allow fluid communication between the outer circumference surface of the valve seat 120 and the upper surface of the valve seat 120, or in which the low pressure path 121 is curved to prevent cavitation at the bent portion. The output path 122 has its section in an "I" shape. Like the pressure path 121, the buffer path 123 has its section in the "L" shape in which the buffer path 123 is bent at a right angle or curved to prevent cavitation at the bent portion.

Figure 8:
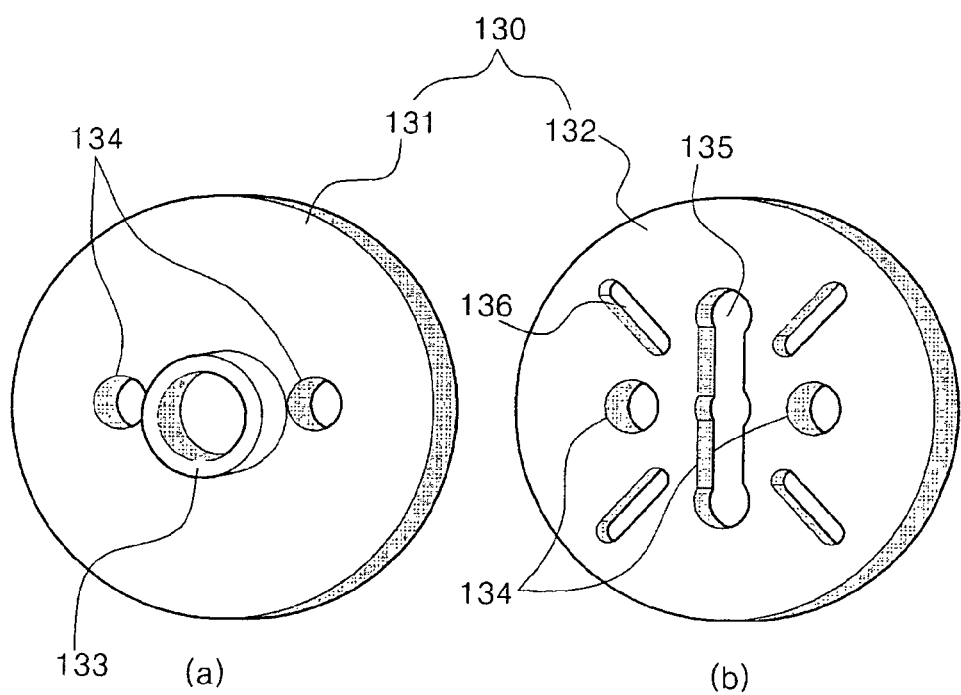
FIG. 8A is a perspective view illustrating a portion of a valve head according to an embodiment of the present invention.
FIG. 8B is a perspective view illustrating another portion of a valve head according to an embodiment of the present invention.

FIGS. 8A and 8B are perspective views illustrating the valve head 130 according to an embodiment of the present invention.

As illustrated in FIGS. 8A and 8B, the valve head 130 comprises an upper valve head 131 and a lower valve head 132. The upper valve head 131 is connected to the shaft of the driving motor 115, so as to be rotated. The lower valve head 132 is positioned between the lower part of the upper valve head 131 and the upper surface of the valve seat 120.

Referring to FIG. 8A, the upper valve head 131 includes a protrusion 133 and a plurality of high pressure holes 134. The protrusion 133 includes an aperture to inwardly receive the shaft of the driving motor 115. The high pressure holes 134 respectively have a round shape and are symmetrically positioned on either side of the protrusion 133.

Referring to FIG. 8B, the lower valve head 132 includes a plurality of high pressure holes 134, a low pressure groove 135, and a plurality of buffer grooves 136. Each high pressure hole 134 is formed to correspond to the position of each high pressure hole 134 formed in the upper valve head 131. The low pressure groove 135 has a stick shape and is formed between the high pressure holes 134. Each buffer groove 136 is formed between an end of the low pressure groove 135 and the high pressure hole 134.

The plurality of buffer grooves 136 are spaced about 45 degrees circumferentially from both ends of the low pressure groove 135 in the stick shape. The buffer grooves 136 respectively have a stick shape and are radially and symmetrically positioned on either side of the low pressure groove 135.

The buffer grooves 136 fill the inside of the buffer 160 with appropriate buffer pressure fluid by connecting the output paths 122 and the buffer paths 123. The buffer grooves 136 also supply the buffer pressure fluid to the freezer 150 while alternately supplying the high pressure fluid and the low pressure fluid to the freezer 150.

The operation of the valve seat and the valve head with the above-described construction will be described below.

The high pressure fluid input through the high pressure port 111 of the pressure container 110 is transferred to the freezer through the high pressure holes 134 formed in the upper and lower valve heads 131 and 132. The high pressure holes 134 are formed to be positioned at the same positions of the output paths 122 of the valve seat 120. Accordingly, when the valve head 130 is rotated by the driving motor 115, the high pressure holes 134 may become aligned with the output paths 122, thereby transferring the high pressure fluid to the freezer 150.

The low pressure fluid is transferred through the low pressure port 112 of the pressure container 110 and the low pressure path 121 of the valve seat 120. The low pressure is transferred to the freezer 150 through the low pressure groove 135 formed in the stick shape in the lower valve head 132. The low pressure groove 135 is shaped so that both its ends may become aligned with the output paths 122 of the valve seat 120. Accordingly, when the valve head 130 is rotated by the driving motor 115, the low pressure groove 135 is aligned with the output paths 122 and the low pressure path 121, and the output paths 122 and the low pressure path 121 are aligned through the low pressure groove 135, thereby transferring the low pressure fluid to the freezer 150 through the output paths 122.

The buffer pressure fluid is transferred through the buffer port 114 of the pressure container 110 and the buffer paths 123 of the valve seat 120. The buffer pressure fluid is transferred to the freezer through the buffer grooves 136 having the stick shape and formed to be radially spaced from the center of the lower valve head 132. When the buffer grooves 136 are aligned with the buffer paths 123 and the output paths 122 of the valve head 130 simultaneously, and the buffer paths 123 and the output paths 122 are aligned through the buffer grooves 136, the buffer pressure fluid is transferred to the freezer 150 through the output paths 122.

Figure 9:
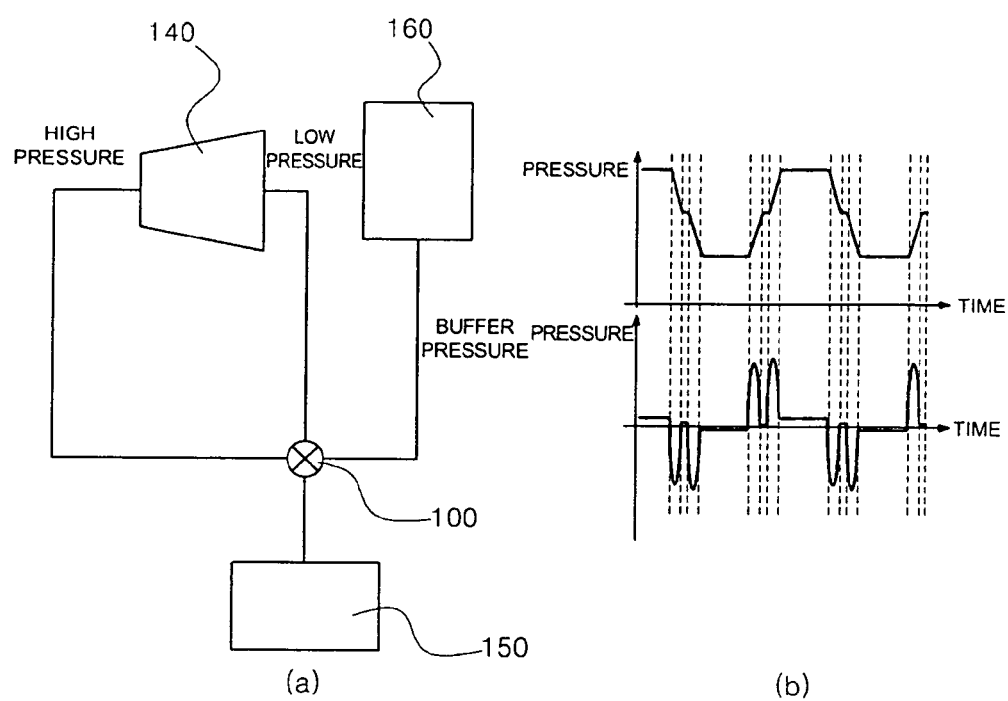
FIG. 9A is a block diagram illustrating a freezing system using the buffered rotary valve according to an embodiment of the present invention.
FIG. 9B is a pressure graph of the freezing system of FIG. 9A.

FIG. 9 is a block diagram illustrating a freezing system using the buffered rotary valve 100 according to an embodiment of the present invention.

Referring to FIG. 9A, in the freezing system using the buffered rotary valve 100, the buffer pressure fluid supplied from the buffer 160, in addition to the high pressure fluid and the low pressure fluid supplied from the compressor 140, is transferred to the freezer 150 through the buffered rotary valve 100. The pressure and the amount of fluid being supplied to the freezer 150 through the buffered rotary valve 100 are shown in FIG. 9B.

Figure 1:
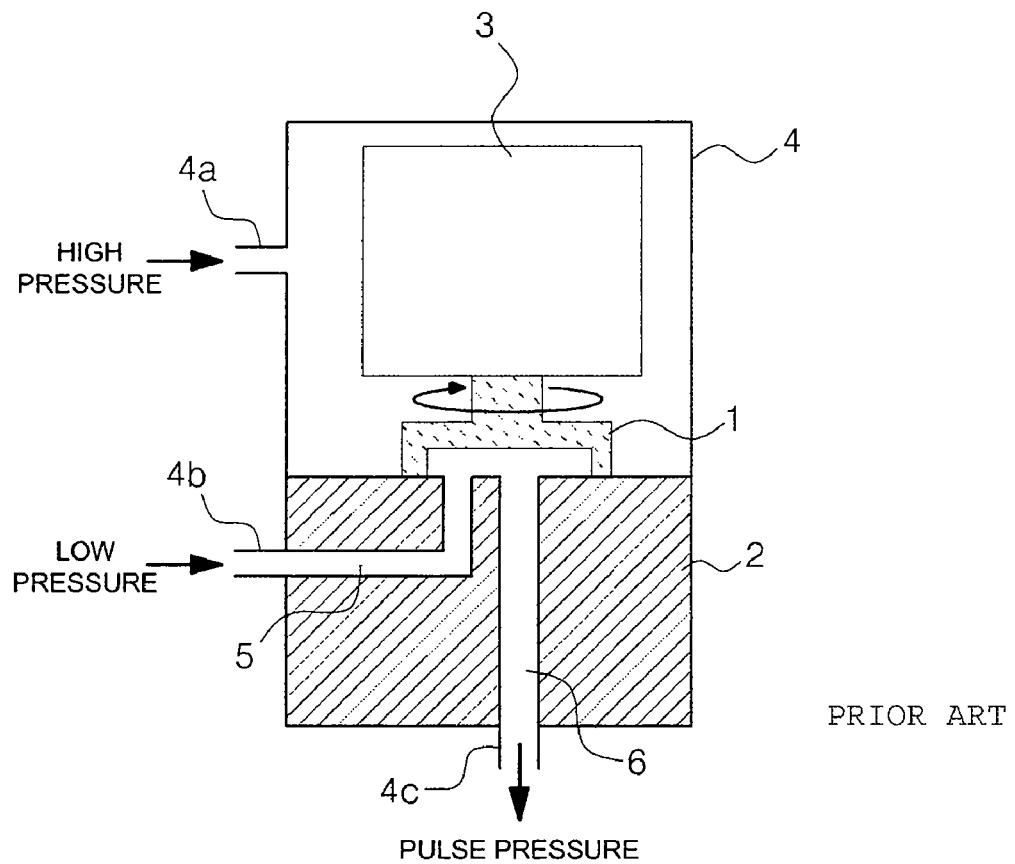
FIG. 1 is a schematic view illustrating a conventional rotary valve.
Figure 2:
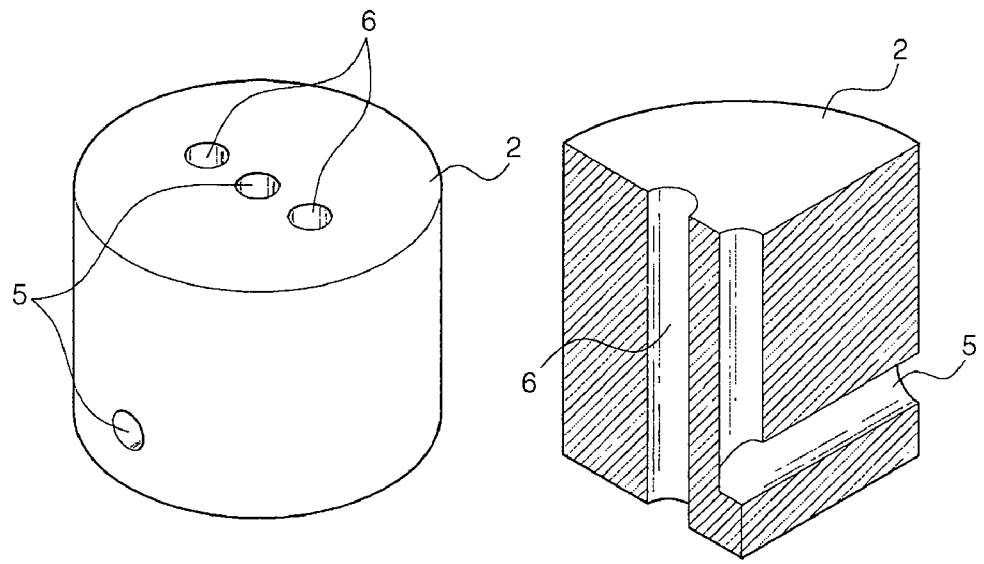
FIG. 2 is a perspective view illustrating a valve seat of the conventional rotary valve.
Figure 3:
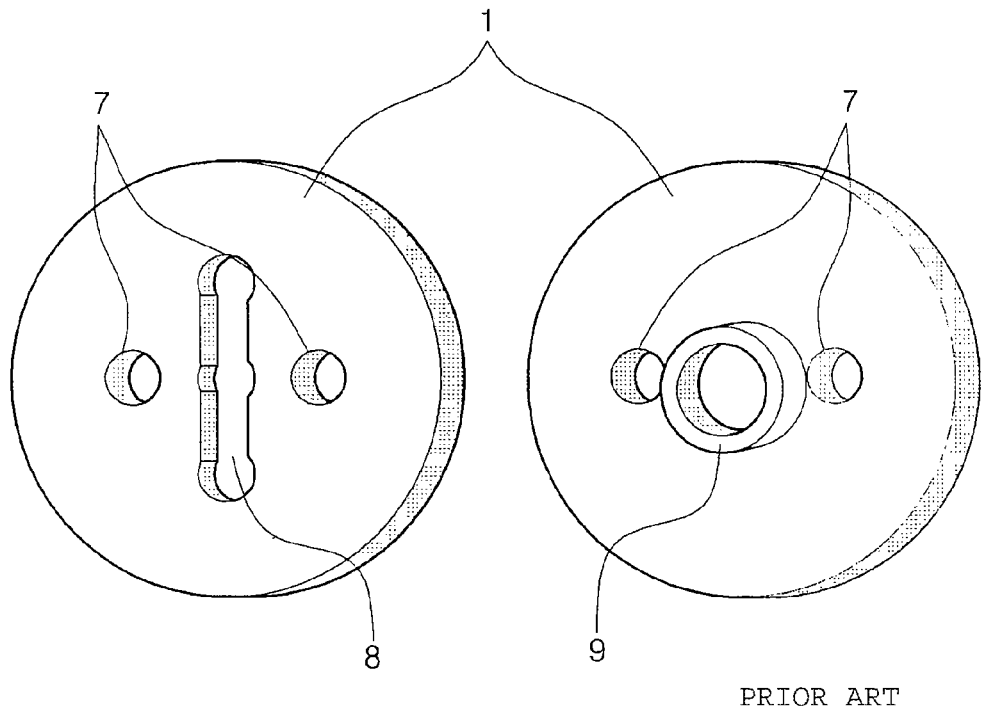
FIG. 3 is a perspective view illustrating a valve head of the conventional rotary valve.
Figure 4:
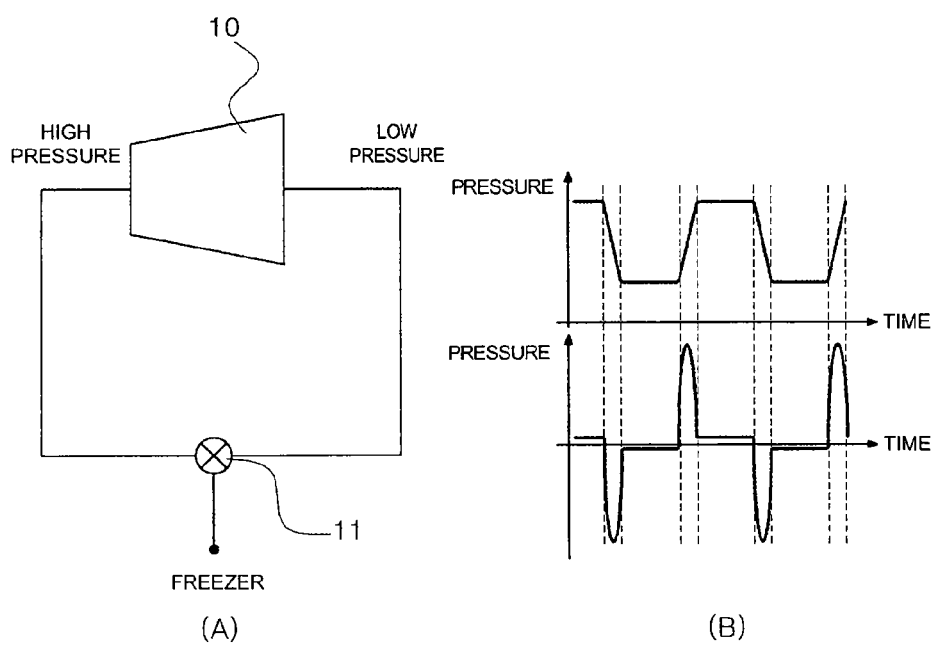
FIG. 4A is a block diagram illustrating a freezing system using the conventional rotary valve.
FIG. 4B is a pressure graph of the freezing system of FIG. 4A.

Unlike the operational characteristics of the general rotary valve as shown in FIG. 4B, in the system using the buffered rotary valve 100, the buffer pressure fluid from the buffer 160 is supplied between when the high pressure fluid and the low pressure fluid are supplied, thereby allowing the buffer 160 to supply a portion of the total fluid being supplied to the freezer 150.

Further, the system using the buffered rotary valve 100 does not allow a large amount of fluid to suddenly flow. Instead, the system allows a smaller amount of fluid to flow at two times, thereby reducing a loss of pressure caused while the fluid flows and, consequently, effectively improving the performance of the freezing system.

As described above, in a buffered rotary valve according to the present invention, a buffer is additionally installed in a rotary valve to supply a fluid of high pressure and a fluid of low pressure, being input from the compressor, to the freezer, thereby lessening the amount of fluid being supplied and unnecessarily consumed, and improving the efficiency of the freezing system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A buffered rotary valve configured to be connected to a compressor, the buffered rotary valve comprising:

a pressure container including a high pressure port, a low pressure port, and a plurality of pulse pressure ports, the high pressure port and the low pressure port formed on an outer surface of the pressure container for connection to an outlet and an inlet of the compressor, respectively, and the plurality of pulse pressure ports formed on a portion of the pressure container and configured to be connected to a freezer;

a valve head connected to a driving motor positioned inside the pressure container, the valve head configured to be rotated by the driving motor;

a valve seat positioned adjacent the valve head and alternately transferring a fluid having a high pressure and a fluid having a low pressure to the freezer as the valve head is rotated; and a buffer positioned on an outer surface of the valve seat and configured to supply a fluid having a buffer pressure, the buffer pressure between the high pressure and the low pressure, wherein the valve seat comprises:

a low pressure path formed to correspond to the low pressure port formed on the outer surface of the pressure container and formed to communicate between the outer surface of the valve seat and a middle portion of an upper surface of the valve seat;

a plurality of output paths, each output path formed to correspond to the position of each pulse pressure port formed at the lower end part of the pressure container and formed to communicate between a lower surface of the valve seat and the upper surface of the valve seat; and a plurality of buffer paths, each buffer path formed to correspond to a buffer port formed on the outer surface of the pressure container and formed to communicate between one end of the outer surface of the valve seat and one end of the upper surface of the valve seat.

2. The buffered rotary valve of claim 1, wherein the valve head comprises a first valve head portion and a second valve head portion, the first valve head portion connected for rotation with a shaft of the driving motor, and the second valve head portion formed to be a single body with a part of the first valve head portion and to be in contact with the upper surface of the valve seat.

3. The buffered rotary valve of claim 2, wherein the first valve head portion comprises a protrusion and a plurality of high pressure holes, the protrusion formed in a middle portion on the upper surface of the first valve head portion and including a groove to inwardly receive the shaft of the driving motor, and the plurality of high pressure holes each having a round shape and symmetrically positioned on either side of the protrusion.

4. The buffered rotary valve of claim 2, wherein the second valve head portion is rotated in the single body with the part of the first valve head portion and comprises a plurality of high pressure holes, a low pressure groove, and a plurality of buffer grooves, each high pressure hole formed to correspond to a high pressure hole formed in the first valve head portion, the low pressure groove having a stick shape and formed between the plurality of high pressure holes, and each buffer groove formed between an end of the low pressure groove and the plurality of high pressure holes.

5. The buffered rotary valve of claim 4, wherein the plurality of buffer grooves are spaced about 45 degrees circumferentially from each end of the low pressure groove, and the plurality of buffer grooves are radially and symmetrically positioned on either side of the low pressure groove.

6. The buffered rotary valve of claim 1, wherein the pressure container is formed in a cylindrical shape.

7. The buffered rotary valve of claim 1, wherein the valve seat is formed in a cylindrical shape and is positioned at a lower end part inside the pressure container.

8. The buffered rotary valve of claim 1, wherein the low pressure path is formed at the middle portion of the upper surface of the valve seat, the plurality of output paths are symmetrically positioned on either side of the low pressure path, and the plurality of buffer paths are formed to be spaced apart from the plurality of output paths in both directions of the low pressure path.

9. The buffered rotary valve of claim 3, wherein the plurality of high pressure holes formed in the first valve head portion and the plurality of high pressure holes formed in the second valve head portion are formed to be positioned at the same positions as the plurality of output paths of the valve seat, so that, when the valve head is rotated by the driving motor, the plurality of high pressure holes formed in the first valve head portion and the plurality of high pressure holes formed in the second valve head portion are aligned with the plurality of output paths.

10. The buffered rotary valve of claim 4, wherein the low pressure groove formed in the second valve head portion and having the stick shape, is formed to allow both ends of the low pressure groove to be positioned at the same position as the plurality of output paths of the valve seat, so that, when the valve head is rotated by the driving motor, the low pressure groove is aligned with the plurality of output paths and the low pressure path, and the plurality of output paths and the low pressure path are aligned through the low pressure groove.

11. The buffered rotary valve of claim 5, wherein the plurality of buffer grooves formed in the lower valve head, which have the stick shape, are formed to be radially spaced from a center of the lower valve head, so that, when the valve head is rotated by the driving motor, the plurality of buffer paths are aligned with the plurality of output paths, and the plurality of buffer paths and the plurality of output paths are aligned through the plurality of buffer grooves.

12. The buffered rotary valve of claim 8, wherein a plurality of high pressure holes formed in a first valve head portion and a plurality of high pressure holes formed in a second valve head portion are formed to be positioned at the same position as the plurality of output paths of the valve seat, so that, when the valve head is rotated by the driving motor, the plurality of high pressure holes formed in the first valve head portion and the plurality of high pressure holes formed in the second valve head portion are aligned with the plurality of output paths.

13. The buffered rotary valve of claim 8, wherein a low pressure groove formed in a portion of the valve head and having a stick shape, is formed to allow both ends of the low pressure groove to be positioned at the same positions as the plurality of output paths of the valve seat, so that, when the valve head is rotated by the driving motor, the low pressure groove is aligned with the plurality of output paths and the low pressure path, and the plurality of output paths and the low pressure path are aligned through the low pressure groove.

14. The buffered rotary valve of claim 8, wherein the plurality of buffer grooves formed in the lower valve head, which have the stick shape, are formed to be radially spaced from a center of the lower valve head, so that, when the valve head is rotated by the driving motor, the plurality of buffer paths are aligned with the plurality of output paths, and the plurality of buffer paths and the plurality of output paths are aligned through the plurality of buffer grooves.

* * * * *